United States Patent
Keren et al.

(10) Patent No.: US 11,297,075 B2
(45) Date of Patent: Apr. 5, 2022

(54) DETERMINE SUSPICIOUS USER EVENTS USING GROUPED ACTIVITIES

(71) Applicant: Microsoft Technology Licensing, LLC, Redmond, WA (US)

(72) Inventors: Shai Keren, Tel Aviv (IL); Yonatan Most, Kfar Saba (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 181 days.

(21) Appl. No.: 16/503,247

(22) Filed: Jul. 3, 2019

(65) Prior Publication Data

US 2021/0006572 A1 Jan. 7, 2021

(51) Int. Cl.
H04L 29/06 (2006.01)
H04L 67/50 (2022.01)

(52) U.S. Cl.
CPC ........ H04L 63/1416 (2013.01); H04L 63/102 (2013.01); H04L 67/22 (2013.01)

(58) Field of Classification Search
CPC ... H04L 63/1416; H04L 63/102; H04L 67/22; G06F 21/55; G06F 21/534
See application file for complete search history.

(56) References Cited

U.S. PATENT DOCUMENTS

| 9,407,652 | B1 | 8/2016 | Kesin et al. |
| 10,931,698 | B2* | 2/2021 | Srivastava ............ H04L 69/22 |
| 2007/0245420 | A1 | 10/2007 | Yong et al. |
| 2009/0158252 | A1* | 6/2009 | Cregut ................... G06F 8/38 717/116 |
| 2013/0097709 | A1* | 4/2013 | Basavapatna ....... H04L 63/1416 726/25 |
| 2014/0188895 | A1* | 7/2014 | Wang .................... G06F 16/335 707/748 |
| 2015/0026027 | A1* | 1/2015 | Priess ................ G06Q 20/4016 705/35 |
| 2015/0172321 | A1* | 6/2015 | Kirti .................. H04L 63/1416 726/1 |
| 2015/0265152 | A1* | 9/2015 | Feldman .............. A61B 5/6852 600/425 |
| 2016/0261621 | A1* | 9/2016 | Srivastava .......... H04L 63/1466 |
| 2017/0206462 | A1* | 7/2017 | Arndt .................. G06F 11/3433 |
| 2018/0124091 | A1* | 5/2018 | Sweeney ............. G06F 16/2228 |
| 2018/0198812 | A1 | 7/2018 | Christodorescu et al. |
| 2018/0365696 | A1* | 12/2018 | Yan ..................... H04L 63/1425 |

OTHER PUBLICATIONS

"International Search Report and Written Opinion Issued in PCT Application No. PCT/US20/032548", dated Jul. 7, 2020, 13 Pages.

* cited by examiner

*Primary Examiner* — Tongoc Tran
(74) *Attorney, Agent, or Firm* — Mannava & Kang, P.C.

(57) ABSTRACT

According to examples, an apparatus may include a processor and a computer readable medium on which is stored machine readable instructions that may cause the processor to assign the activities in user activity data into a plurality of groups based on common user identifiers corresponding to the pairs of activities. The instructions may also cause the processor to determine a correlation between a user event and the plurality of groups, determine whether the user event is suspicious based on the determined correlation, and based on a determination that the user event is suspicious, output an indication that the user event is suspicious.

18 Claims, 6 Drawing Sheets

DETERMINE SUSPICIOUS USER EVENTS USING GROUPED ACTIVITIES

BACKGROUND

Users of applications, such as cloud-based applications, may perform various types of activities on the applications. For instance, users may download information from the applications, may upload information to the applications, or otherwise interact with the applications. In many instances, such as in workplace environments, the users may be assigned different roles with respect to the applications. For example, some users may be assigned to a first group and other users may be assigned to a second group, in which users in the first group normally perform a first set of activities on the applications and users in the second particular group may normally perform a second set of activities on the applications.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
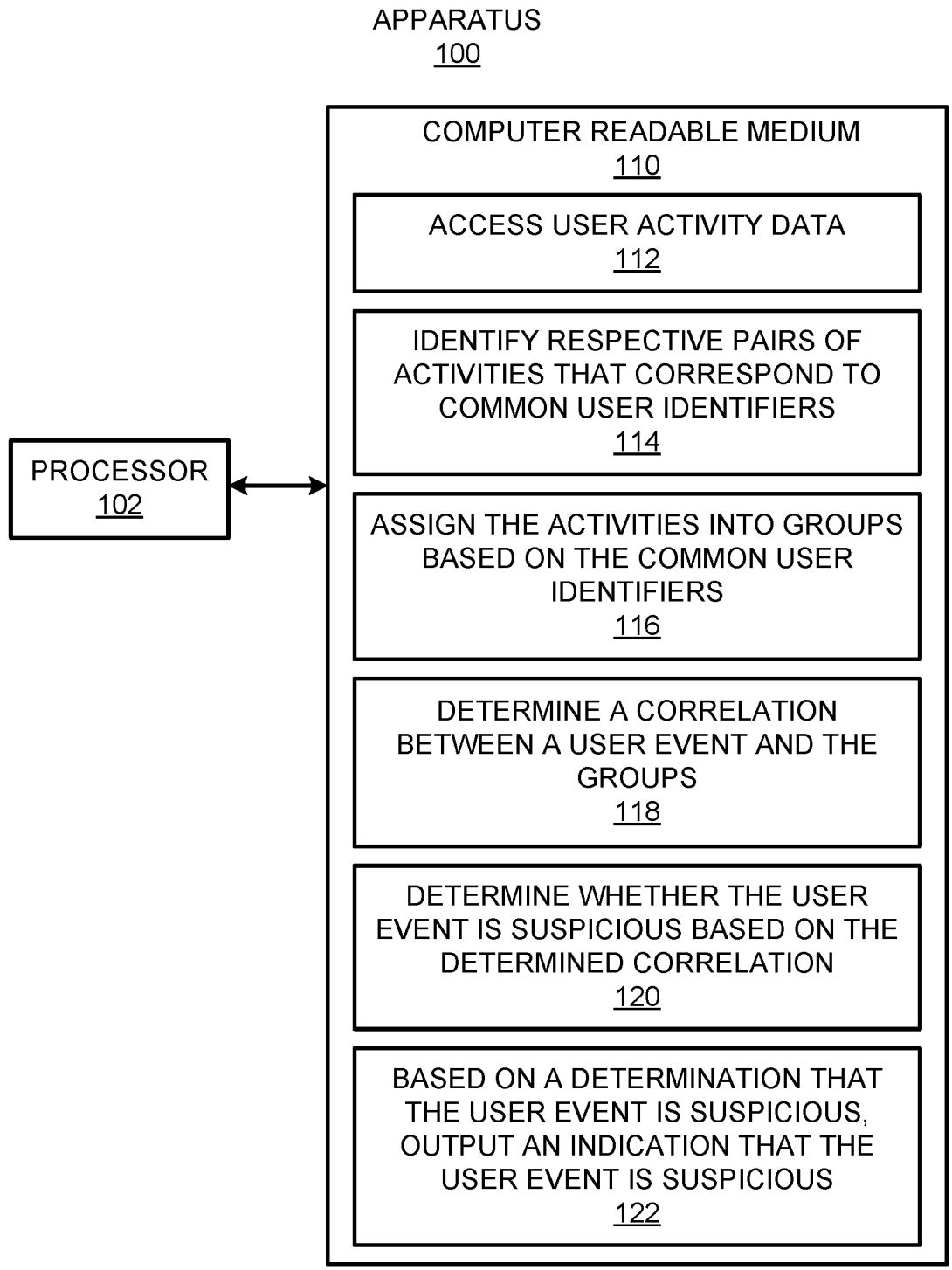
FIG. 1 depicts a block diagram of an apparatus that may determine whether a user event, such as a user event with respect to an application, is suspicious in accordance with an embodiment of the present disclosure.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

Disclosed herein are apparatuses, methods, and computer readable media that may determine whether a user event with respect to an application is suspicious. Particularly, a processor as disclosed herein may assign previously performed activities by multiple users with respect to the application into multiple groups based on, for instance, strengths of relations between the activities. The strengths of relations may be based on the number of times users performed pairs of the activities. Thus, for instance, the processor may group the activities that have the strongest relations together into respective groups of activities. In addition, the processor may determine which of the groups a user (or equivalently, the user identifier) of a user event belongs based on, for instance, a comparison of the user's prior activities and the activities included in the groups. For instance, the processor may determine that a user belongs to a group if the user's prior activities match a predefined threshold number of the activities included in the group.

The processor may determine whether the user event falls within a group to which the user is determined to belong. For instance, the processor may determine whether the user event matches any of the activities included in the group to which the user belongs. Based on a determination that the user event matches an activity included in the group, the processor may determine that the user event falls within the group. The processor may make this determination even though the matching activity may not be an activity that is included in the user's prior activities. Thus, for instance, the processor may not automatically determine that a user event is suspicious if the user event does not match a user's prior activity, which may result in a fewer number of user events being deemed suspicious.

However, the processor may determine that the user event does not fall within the group to which the user belongs if the user event does not match any of the activities included in the group. In other words, the processor may determine that the user event is outside the norm of activities that users that perform similar activities as the user normally perform. As a result, the processor may output an indication that the user event is suspicious such that, for instance, performance of further review of the user event may be suggested. The processor may perform additional actions, such as limiting or denying access by the user to the application in instances in which the user event is deemed to be suspicious.

A technical problem associated with determining whether a user event is suspicious may be that the user event may be determined to be suspicious too often, which may result in a large number of false positive outputs. That is, for instance, a user may often perform an activity that the user has not previously performed as part of their function within an organization. Simply categorizing all of such activities as suspicious may result in a large number of improper or unnecessary determinations of suspicious activities. This may lead to a large number of improper or unnecessary outputs of indications that a suspicious activity has been detected, when such suspicious activity did not occur. As the outputs may typically be generated by a computer and communicated over a network, the improper or unnecessary outputs may result in wasted computer and/or network utilization as well as wasted time by an administrator that may have to review and act upon the outputs.

Through implementation of the apparatuses, methods, and computer readable media disclosed herein, the criteria for determining whether a user event is suspicious may be refined. That is, a user event may not automatically be determined to be suspicious because the user event corresponds to a new activity by a user. Instead, the user event may be determined to be suspicious if the user event does not fall within a group of activities to which the user of the user event belongs. Particularly, the user event may be determined to not be suspicious if users in a group similar to the user perform an activity matching the user event. As a result, a user event may not automatically be determined as being suspicious if the user event does not match a user's prior activity, which may result in a fewer number of user events being deemed suspicious. Consequently, the number of improper or unnecessary outputs regarding potentially suspicious activity may be reduced or eliminated, which may reduce wasted computer and/or network utilization.

Figure 2:
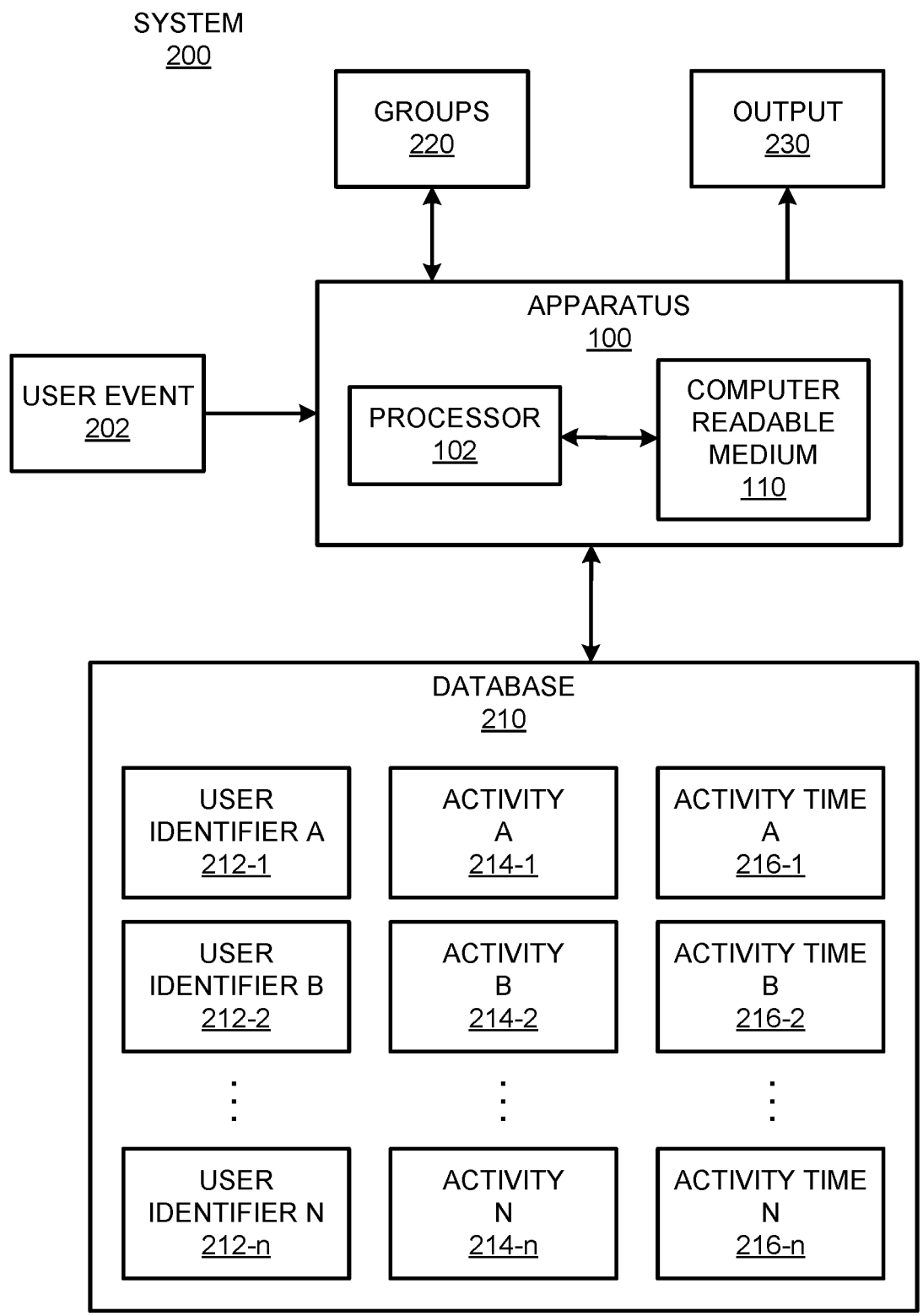
FIG. 2 shows a block diagram of a system in which the apparatus depicted in FIG. 1 may be implemented to determine whether a user event is suspicious in accordance with an embodiment of the present disclosure.

Reference is first made to FIGS. 1 and 2. FIG. 1 shows a block diagram of an apparatus 100 that may determine whether a user event, such as a user event with respect to an application, is suspicious in accordance with an embodiment of the present disclosure. FIG. 2 shows a block diagram of a system 200 in which the apparatus 100 depicted in FIG. 1 may be implemented to determine whether a user event is suspicious in accordance with an embodiment of the present disclosure. It should be understood that the apparatus 100 depicted in FIG. 1 and/or the system 200 depicted in FIG. 2 may include additional features and that some of the features described herein may be removed and/or modified without departing from the scopes of the apparatus 100 and/or the system 200.

The apparatus 100 may be a server, a node in a network (such as a data center), a personal computer, a laptop computer, a tablet computer, a smartphone, a network gateway, a network router, an Internet of Things (IoT) device, and/or the like. As shown in FIG. 2, the apparatus 100 may receive a user event 202 and may communicate with a database 210 to access information that the apparatus 100 may use to determine whether the user event 202 is suspicious, which may equivalently be termed abnormal, improper, unexpected, and/or the like. The database 210 may be a collection of data that may be organized in any of a number of different manners and may be stored in a memory (not shown). The memory may be a physical storage drive or multiple storage drives that may be in a storage array, in a server, and/or the like. In some examples, the database 210 may be included in the apparatus 100.

As shown, the database 210 may include user identifiers 212-1 to 212-$n$, activities 214-1 to 214-$n$, and activity times 216-1 to 216-$n$, which may collectively be termed user activity data, and in which the variable "n" may represent a value greater than one. The first user identifier 212-1 may correspond to the first activity 214-1 and the first activity time 216-1. That is, the first activity 214-1 may have been performed by a user to which the first user identifier 212-1 is associated at the first activity time 216-1. Similarly, the second user identifier 212-2 may correspond to the second activity 214-2 and the second activity time 216-2. The remaining sets of user identifiers 212-3 to 212-$n$, activities 214-3 to 214-$n$, and activity times 216-1 to 216-$n$ may have similar respective correspondences. Some of the user identifiers 212-1 to 212-$n$ may be the same such that the same user identifier may correspond to multiple activities 214-1 to 214-$n$. Likewise, some of the activities 214-1 to 214-$n$ may be same such that the same activity may correspond to multiple user identifiers.

According to examples, the user activity data may correspond to user activity on an application, such as a web-based application, cloud application, and/or the like. For instance, the application may be an application for which different users may perform various types of activities with respect to the application. By way of particular example, the application may be a business management software in which a first group of users may perform contact operations, a second group of users may perform operations related to leads, a third group of users may perform operations related to managing user permissions, and additional groups of users may perform other operations with respect to the application. In other examples, the application may be other types of software, such as email software, data management software, or the like. The applications may equivalently also be termed software, services, programs, or the like.

The user activity data may be collected and may be stored in the database 210. The application or another application may collect the user activity data on the application and may communicate the collected user activity data to a server or other device for the user activity data to be stored in the database 210. In these examples, the database 210 may be stored separately from the application. According to examples, an entity that is separate from an entity that manages and/or operates the application may manage the database 210. In addition, or alternatively, the user activity data may include data that may have been collected over a certain period of time, e.g., a week, a month, six months, or the like. In this regard, the user activity data may be updated over time, which may result in changes in the correspondences between the user identifiers 212-1 to 212-$n$ and the activities 214-1 to 214-$n$.

As shown in FIGS. 1 and 2, the apparatus 100 may include a processor 102 and a computer readable medium 110. The processor 102 may be a semiconductor-based microprocessor, a central processing unit (CPU), an application specific integrated circuit (ASIC), a field-programmable gate array (FPGA), and/or other hardware device. Although the apparatus 100 is depicted as having a single processor 102, it should be understood that the apparatus 100 may include additional processors and/or cores without departing from a scope of the apparatus 100. In this regard, references to a single processor 102 as well as to a single machine readable medium 110 may be understood to additionally or alternatively pertain to multiple processors 102 and multiple computer readable mediums 110.

The computer readable medium 110 may be, for example, Random Access memory (RAM), an Electrically Erasable Programmable Read-Only Memory (EEPROM), a storage device, an optical disc, or the like. The computer readable medium 110, which may also be referred to as a machine readable storage medium, may be a non-transitory computer readable storage medium, where the term "non-transitory" does not encompass transitory propagating signals. In any regard, the computer readable medium 110 may have stored thereon machine readable instructions 112-122.

The processor 102 may fetch, decode, and execute the instructions 112 to access user activity data that identifies activities 214-1 to 214-$n$ and user identifiers 212-1 to 212-$n$ corresponding to the activities 214-1 to 214-$n$. The processor 102 may access the user activity data stored in the database 210.

The processor 102 may fetch, decode, and execute the instructions 114 to identify respective pairs of activities 214-1 to 214-$n$ that correspond to common user identifiers 212-1 to 212-$n$ in the user activity data. The processor 102 may identify, from the accessed user activity data, pairs of activities 214-1 to 214-$n$ to which the user identifiers 212-1 correspond. That is, the processor 102 may identify each of the activities 214-1 to 214-$n$ to which each of the user identifiers 212-1 to 212-$n$ corresponds and may identify respective pairs of activities that the user performed.

By way of example, the processor 102 may determine that a first user identifier 212-1 corresponds to a first activity 214-1, a second activity 214-2, and a third activity 214-3. The processor 102 may also determine that a second user identifier 212-2 corresponds to the first activity 214-1 and the second activity 214-2. In this example, the processor 102 may determine that the pair of the first activity 214-1 and the second activity 214-2 corresponds to the first user identifier 212-1 as well as the second user identifier 212-2. The processor 102 may also determine that the pair of the first activity 214-1 and the third activity 214-3 corresponds to the first user identifier 212-1 but not the second user identifier 212-2. Likewise, the processor 102 may determine that the pair of the second activity 214-2 and the third activity 214-3 corresponds to the first user identifier 212-1 but not the second user identifier 212-2.

According to examples, the processor 102 may determine, for each of the respective pairs of activities 214-1 to 214-n, a number of user identifiers 212-1 to 212-n that corresponds to the pair of activities 214-1 to 214-n. In the example provided above, the pair of the first activity 214-1 and the second activity 214-2 corresponds to the first and second user identifiers 212-1 and 212-2 and thus, to two user identifiers. The pair of the first activity 214-1 and the third activity 214-3 corresponds to the first user identifier 212-1 and thus, to one user identifier. The pair of the second activity 214-2 and the third activity 214-3 corresponds to the first user identifier 212-1 and thus, to one user identifier.

The processor 102 may fetch, decode, and execute the instructions 116 to assign the activities 214-1 to 214-n into a plurality of groups 220 based on the common user identifiers 212-1 to 212-n corresponding to the pairs of activities 214-1 to 214-n. For instance, the processor 102 may assign the activities 214-1 to 214-n based on respective strengths of the correspondences between the activities 214-1 to 214-n and the user identifiers 212-1 to 212-n. By way of example, the pairs of activities 214-1 to 214-n corresponding to a predefined number and/or percentage of common user identifiers may be grouped together.

Keeping with the example discussed above, the first activity 214-1 and the second activity 214-2 may be grouped together into a first group and the first activity 214-1 and the third activity 214-3 may be grouped together into a second group. Although a simple example is provided herein, it should be understood that the groups 220 may include multiple pairs of activities 214-1 to 214-n. According to examples, the processor 102 may run a clustering algorithm to group the activities 214-1 to 214-n into the plurality of groups 220. In addition, or alternatively, each of the activities 214-1 to 214-n may be assigned to one of the groups 220, e.g., an activity 214-1 may not be assigned to multiple groups.

The processor 102 may fetch, decode, and execute the instructions 118 to determine a correlation between a user event 202 and the plurality of groups 220. The processor 102 may receive the user event 202 from the application with which the user interacts or another application and the user event 202 may be an activity that the user performs on the application. According to examples, the processor 102 may identify a user identifier 212-1 of the user event 202, e.g., the user identifier 212-1 corresponding to the user event 202. In addition, the processor 102 may determine prior user activities corresponding to the identified user identifier, e.g., from the user activity data included in the database 210.

The processor 102 may further determine, based on the determined prior user activities, to which of the groups 220 the identified user identifier belongs. For instance, the processor 102 may compare the determined prior user activities to the activities included in each of the groups 220 and based on the comparison, may determine to which of the groups 220 the user identifier of the user event 202 belongs. According to examples, the processor 102 may determine that the user identifier of the user event 202 belongs to a group 220 based on the user identifier corresponding to at least a predefined number of the activities 214-1 to 214-n included in the group 220. The predefined number of activities may be determined based on historical data, user-defined, and/or the like. As the user identifier of the user event 202 may correspond to at least a predefined number of the activities 214-1 to 214-n included in multiple groups 220, the user identifier may be determined to belong to multiple groups 220.

The processor 102 may fetch, decode, and execute the instructions 120 to determine whether the user event 202 is suspicious based on the determined correlation. For instance, the processor 102 may determine that the user event 202 does not fall within a group 220 to which the user identifier belongs. That is, the processor 102 may determine whether the user event 202 matches any of the activities 214-1 to 214-n in the group 220. Based on a determination that the user event 202 does not match any of the activities 214-1 to 214-n in a group 220 to which the user identifier belongs, the processor 102 may determine that the user event 202 does not fall within a group 220 to which the user identifier belongs. In addition, based on a determination that the user event 202 does not fall within a group 220 to which the user identifier belongs, the processor 102 may determine that the user event 202 is suspicious.

The processor 102 may fetch, decode, and execute the instructions 122 to, based on a determination that the user event 202 is suspicious, output 230 an indication that the user event 202 is suspicious. For instance, the processor 102 may output 230 a message that includes the indication, such that an administrator or other personnel may be informed of the suspicious event and may determine whether an action is to be taken. In addition, or alternatively, the processor 102 may output 230 an instruction to limit and/or deny access by the user to the application.

However, based on a determination that the user event 202 matches an activity of the activities 214-1 to 214-n in the group 220 to which the user identifier belongs, the processor 102 may determine that the user event 202 falls within the group 220. The processor 102 may make this determination even in instances in which none of the prior user activities matches any of the activities 214-1 to 214-n in the group 220 to which the user identifier belongs. That is, the processor 102 may determine that the user event 202 falls within the group 220 even though the user may not have performed any of the activities 214-1 to 214-n in the group 220. As such, even though the user may not have performed any of the activities 214-1 to 214-n in the group 220, the processor 102 may not determine that the performance by the user of the user event 202 is suspicious.

Instead of the machine readable instructions 112-122, the apparatus 100 may include hardware logic blocks that may perform functions similar to the instructions 112-122. In other examples, the apparatus 100 may include a combination of instructions and hardware logic blocks to implement or execute functions corresponding to the instructions 112-122. In any of these examples, the processor 102 may implement the hardware logic blocks and/or execute the instructions 112-122. As discussed herein, the apparatus 100 may also include additional instructions and/or hardware logic blocks such that the processor 102 may execute operations in addition to or in place of those discussed above with respect to FIG. 1.

Figure 3:
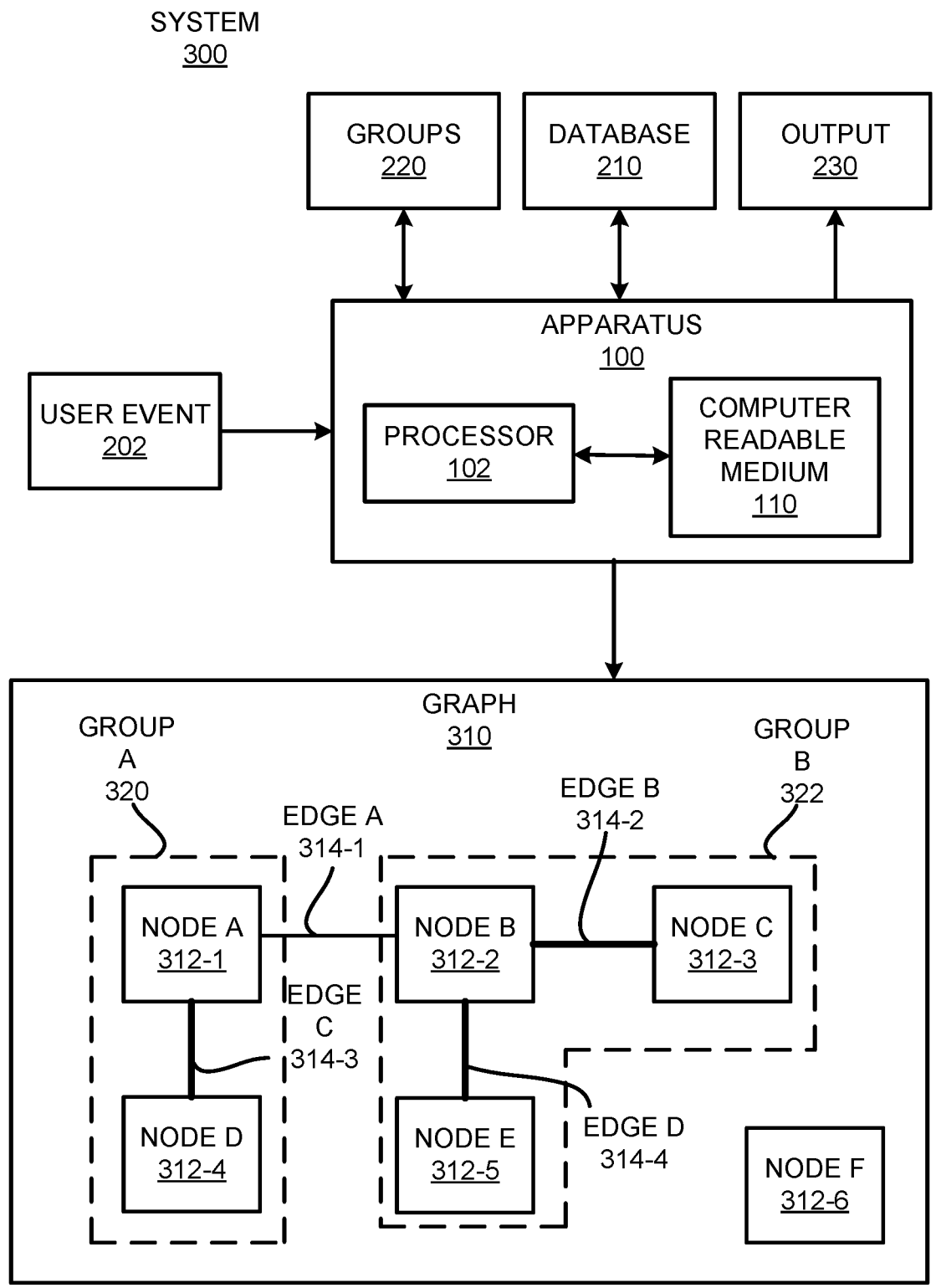
FIG. 3 shows a block diagram of a system in which the apparatus depicted in FIG. 1 may be implemented to assign a plurality of activities into a plurality of groups in accordance with an embodiment of the present disclosure.

Turning now to FIG. 3, there is shown a block diagram of a system 300 in which the apparatus 100 depicted in FIG. 1 may be implemented to assign a plurality of activities 214-1 to 214-n into a plurality of groups 220 in accordance with an embodiment of the present disclosure. It should be understood that the system 300 depicted in FIG. 3 may include additional features and that some of the features described herein may be removed and/or modified without departing from the scope of the system 300.

As shown in FIG. 3, the processor 102 may create a graph 310 that depicts nodes 312-1 to 312-6 and edges 314-1 to 314-4. The nodes 312-1 to 312-6 may each represent an activity 214-1 to 214-2 included in the database 210 and/or that the processor 102 uses to determine whether a user event 202 is suspicious. The edges 314-1 to 314-4 may each represent a number of user identifiers 212-1 to 212-n that corresponds to the pair of nodes 312-1 to 312-6 to which the edges 314-1 to 314-4 connect as identified from the database 210 and/or the user activity data that the processor 102 uses to determine whether a user event 202 is suspicious.

It should be understood that a relatively small number of nodes 312-1 to 312-6 and edges 314-1 to 314-4 are depicted in FIG. 3 for purposes of simplicity of illustration and not of limitation. Accordingly, it should be understood that the processor 102 may create the graph 310 to include any number of nodes 312-1 to 312-6 and edges 314-1 to 314-4, for instance, in which the number may depend upon the user activity data that the processor 102 uses to create the graph 310. For instance, the number of nodes 312-1 to 312-6 may correspond to the number of unique activities 214-1 to 214-n in the database 210 and/or that the processor 102 may use to determine whether a user event 202 is suspicious. Likewise, the number of edges 314-1 to 314-4 may correspond to the number of pairs of nodes 312-1 to 312-6 to which user identifiers 212-1 to 212-n commonly correspond.

According to examples, the processor 102 may determine, for each of respective pairs of activities 214-1 to 214-n, a number of user identifiers 212-1 to 212-n that corresponds to the pair of activities 214-1 to 214-n. In addition, the processor 102 may assign each of the activities 214-1 to 214-n as a respective node 312-1 to 312-6 in the graph 310. The processor 102 may also assign edges 314-1 to 314-n between respective pairs of nodes 312-1 to 312-6, in which a property of each of the edges 314-1 to 314-n corresponds to the determined number of user identifiers 212-1 to 212-n for the respective pair of nodes to which the edge connects. The processor 102 may determine the nodes 312-1 to 312-6 by going over the set of user activity data to determine the unique activities and may determine the edges 314-1 to 314-4 through an analysis of the correspondences between the activities 214-1 to 214-n and the user identifiers 212-1 to 212-n.

By way of particular example, the first node 312-1 may correspond to a first activity 214-1, a second node 312-2 may correspond to a second activity 214-2, a third node 312-3 may correspond to a third activity 214-3, a fourth node 312-4 may correspond to a fourth activity 214-4, a fifth node 312-5 may correspond to a fifth activity 214-5, and a sixth node 312-6 may correspond to a sixth activity 214-6. In addition, a single user identifier may correspond to a first pair of the nodes 312-1 and 312-2, multiple user identifiers may correspond to a second pair of the nodes 312-2 and 312-3, multiple user identifiers may correspond to a third pair of the nodes 312-1 and 312-4, and multiple user identifiers may correspond to a fourth pair of the nodes 312-2 and 312-5. Moreover, the sixth node 312-6 may not be paired with another node because, for instance, none of the user identifiers correspond to both the sixth node 312-6 and another node.

In the example shown, the edges 314-1 to 314-4 may be depicted to have a property that corresponds to the determined number of user identifiers for the respective pair of nodes 312-1 to 312-6 to which the edge connects. The property may be, for instance, a color, a width, a transparency level, and/or the like. In any regard, the edges 314-1 to 314-4 may denote the strengths of the relations between two activities represented by the nodes to which the edges are connected.

In any regard, the processor 102 may assign the activities 214-1 to 214-n into a plurality of groups 320, 322 based on the properties of the edges 314-1 to 314-4 between the respective pairs of nodes 312-1 to 312-6. According to examples, the processor 102 may employ a community detection algorithm to group the nodes 312-1 to 312-6 into the groups 320, 322. As shown in FIG. 3, the processor 102 may group the first node 312-1 and the fourth node 312-4 into a first group 320 because the graph 310 indicates that the strength of the relation between the first node 312-1 and the fourth node 312-4 may exceed a predefined threshold, e.g., that at least a certain number of user identifiers correspond to the pair of the first node 312-1 and the fourth node 312-4. In addition, the processor 102 may group the second node 312-2, the third node 312-3, and the fifth node 312-5 into a second group 322 for similar reasons. As also shown, the processor 102 may not group the first node 312-1 into the second group 322 because, for instance, the number of user identifiers that correspond to the pair of the first node 312-1 and the third node 312-3 may not exceed the predefined threshold. Additionally, the sixth node 312-6 may not be assigned to either of the groups 320, 322. In some examples, the processor 102 may also apply a distinguishing characteristic to the nodes 312-1 to 312-6 according to the groups 320, 322 in which the nodes 312-1 to 312-6 are assembled. For instance, the processor 102 may cause the nodes in a particular group 320 to have the same color and/or other characteristic.

The processor 102 may store the groups 320, 322 in a data store (not shown). That is, the processor 102 may store an identification of the activities 214-1 to 214-n that are included in each of the groups 320, 322. As discussed herein, the processor 102 may use the determined groups 320, 322 and the activities 214-1 to 214-n included in the groups 320, 322 to determine whether a user event 202 is suspicious. In addition, the processor 102 may determine the groups of activities at set periods of time, e.g., once a week, once a month, etc., following certain events, in response to an instruction to determine the groups, and/or the like, such that, for instance, the groups may be determined and/or updated dynamically as the user activity data changes.

Figure 4:
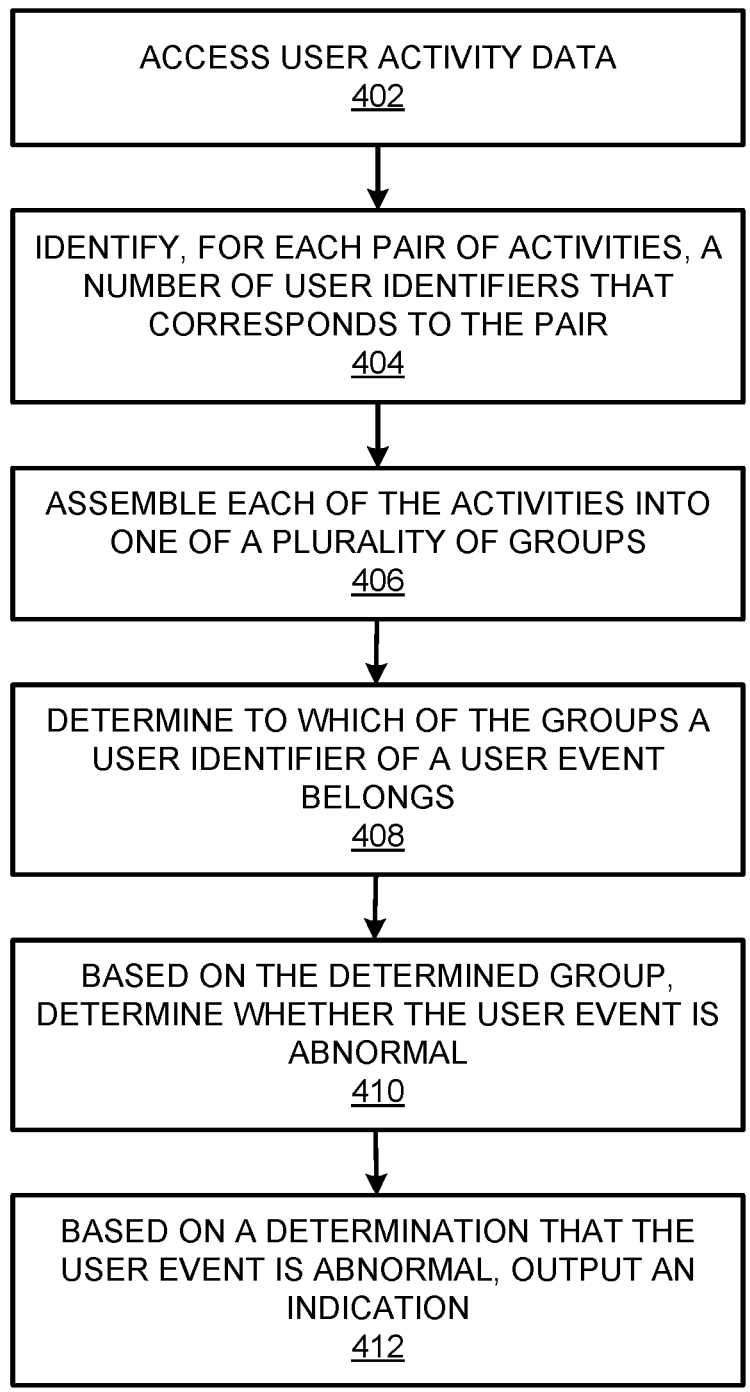
FIGS. 4 and 5, respectively, depict flow diagrams of methods for determining whether a user event is abnormal in accordance with embodiments of the present disclosure.
Figure 5:
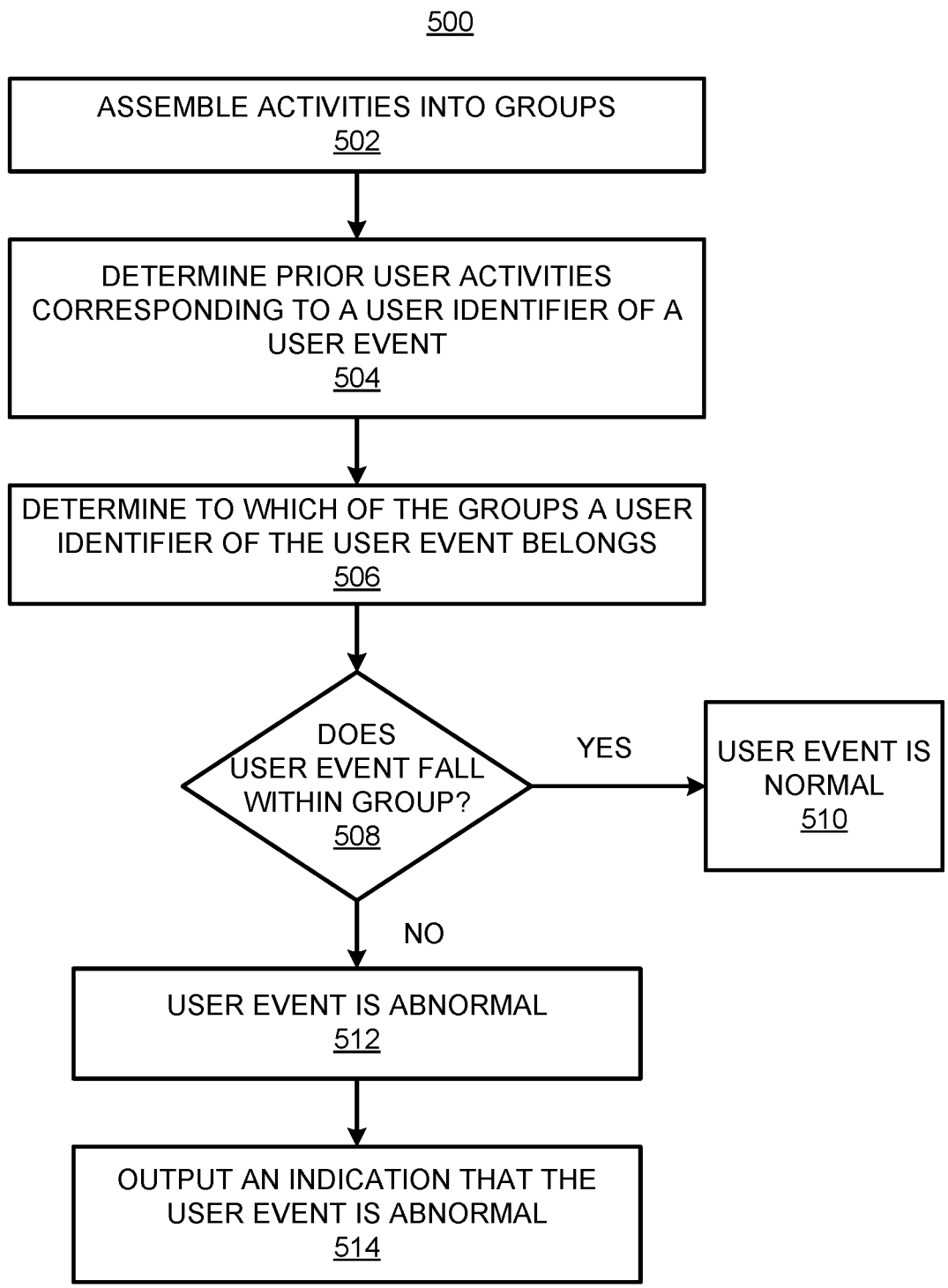

Various manners in which the processor 102 of the apparatus 100 may operate are discussed in greater detail with respect to the methods 400 and 500 respectively depicted in FIGS. 4 and 5. Particularly, FIGS. 4 and 5, respectively, depict flow diagrams of methods 400 and 500 for determining whether a user event is abnormal in accordance with embodiments of the present disclosure. It should be understood that the methods 400 and 500 depicted in FIGS. 4 and 5 may include additional operations and that some of the operations described therein may be removed and/or modified without departing from the scopes of the methods 400 and 500. The descriptions of the methods 400 and 500 are made with reference to the features depicted in FIGS. 1-3 for purposes of illustration.

At block 402, the processor 102 may access user activity data pertaining to an application. As discussed herein, the user activity data may include activities 214-1 to 214-$n$ and user identifiers 212-1 to 212-$n$ corresponding to the activities 214-1 to 214-$n$. In addition, the processor 102 may access the user activity data from a database 210.

At block 404, the processor 102 may identify, for each of a plurality of pairs of the activities 214-1 to 214-$n$, a number of user identifiers 212-1 to 212-$n$ that corresponds to the pair of the activities 214-1 to 214-$n$. The processor 102 may identify the number of user identifiers 212-1 to 212-$n$ from the information included in the database 210.

At block 406, the processor 102 may assemble each of the activities 214-1 to 214-$n$ into one of a plurality of groups 220 based on the identified number of user identifiers 212-1 to 212-$n$ corresponding to the activities 214-1 to 214-$n$. The processor 102 may assemble the activities 214-1 to 214-$n$ into the groups 220 in any of the manners discussed herein. For instance, the processor 102 may generate a graph 310 and may assemble the activities 214-1 to 214-$n$ into the groups 220 based on information depicted in the graph 310.

At block 408, the processor 102 may determine to which of the plurality of groups 220 a user identifier of a user event 202 belongs. The processor 102 may make this determination based on prior activities to which the user identifier corresponds and how those prior activities match up to the activities in the groups 220 as discussed herein.

At block 410, the processor 102 may, based on the determined group 220 to which the user identifier of the user event 202 belongs, determine whether the user event is abnormal. For instance, the processor 102 may determine that the user event 202 is abnormal based on a determination that the user event does not fall within the group 220, e.g., does not match any of the activities in the group 220 to which the user identifier belongs.

At block 412, the processor 102 may, based on a determination that the user event 202 is abnormal, output 230 an indication that the user event 202 is abnormal. The processor 102 may also output 230 an instruction to limit or deny access by a user identifier associated with the user event 202 to the application.

Turning now to FIG. 5, at block 502, the processor 102 may assemble activities 214-1 to 214-$n$ of users with respect to an application into groups 220 as discussed herein. In addition, at block 504, the processor 102 may determine prior user activities corresponding to a user identifier of a user event 202. The processor 102 may determine, for instance, the prior user activities from the user activity data included in the database 210. At block 506, the processor 102 may determine to which of the groups 220 the user identifier of the user event 202 belongs. At block 508, the processor 102 may determine whether the user event 202 falls within a group 220 to which the user identifier of the user event 202 is grouped. Based on a determination that the user event 202 falls within a group 220 to which the user identifier of the user event 202 is grouped, at block 510, the processor 102 may determine that the user event 202 is normal. Thus, for instance, the processor 102 may determine that the user event 202 is normal even in instances in which the user event 202 does not match any of the activities included in the group 220 to which the user identifier belongs.

However, based on a determination that the user event 202 does not fall within a group 220 to which the user identifier of the user event 202 is grouped, at block 512, the processor 102 may determine that the user event 202 is abnormal. In addition, at block 514, the processor 102 may output an indication that the user event 202 is abnormal. The processor 102 may also output 230 an instruction to limit or deny access by a user identifier associated with the user event 202 to the application.

Some or all of the operations set forth in the methods 400 and 500 may be included as utilities, programs, or subprograms, in any desired computer accessible medium. In addition, the methods 400 and 500 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 6:
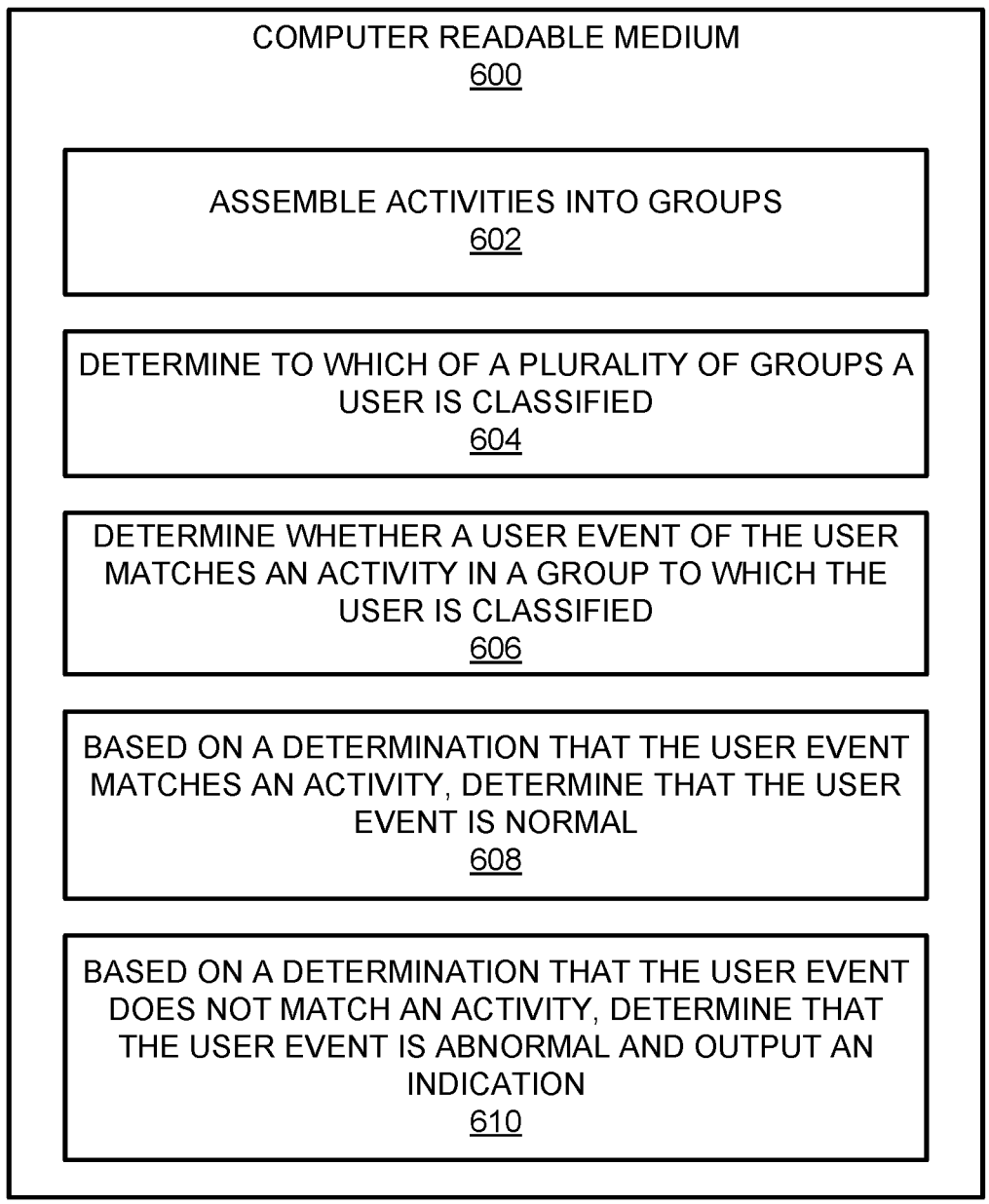
FIG. 6 depicts a block diagram of a computer readable medium that may have stored thereon machine readable instructions that when executed by a processor, may cause the processor to determine whether a user event is abnormal in accordance with an embodiment of the present disclosure.

Turning now to FIG. 6, there is shown a block diagram of a computer readable medium 600 that may have stored thereon machine readable instructions that when executed by a processor, may cause the processor to determine whether a user event is abnormal in accordance with an embodiment of the present disclosure. It should be understood that the computer readable medium 600 depicted in FIG. 6 may include additional instructions and that some of the instructions described herein may be removed and/or modified without departing from the scope of the computer readable medium 600 disclosed herein. The computer readable medium 600 may be a non-transitory computer readable medium. The term "non-transitory" does not encompass transitory propagating signals.

The computer readable medium 600 may have stored thereon machine readable instructions 602-610 that a processor, such as the processor 102 depicted in FIGS. 1 and 2, may execute. The computer readable medium 600 may be an electronic, magnetic, optical, or other physical storage device that contains or stores executable instructions. The computer readable medium 600 may be, for example, Random Access memory (RAM), an Electrically Erasable Programmable Read-Only Memory (EEPROM), a storage device, an optical disc, and the like.

The processor may fetch, decode, and execute the instructions 602 to assemble activities 214-1 to 214-$n$ into a plurality of groups 220. The processor may assemble the activities 214-1 to 214-$n$ into the plurality of groups 220 in any of the manners discussed herein. For instance, the processor may identify correlations between users (e.g., users associated with user identifiers 212-1 to 212-$n$) and activities 214-1 to 214-$n$ on an application and may assemble the activities 214-1 to 214-$n$ into the plurality of groups 220 based on the identified correlations. As another example, the processor may assign each of the activities 214-1 to 214-$n$ in the plurality of activities as a respective node 312-1 to 312-6 in a graph 310 and may assign edges 314-1 to 314-4 between respective pairs of nodes 312-1 to 312-6, in which a property of each of the edges 314-1 to 314-4 may correspond to the determined number of user identifiers for the respective pair of nodes 312-1 to 312-6 to which the edge 314-1 to 314-4 connects. The processor may also apply a distinguishing characteristic to the nodes 312-1 to 312-6 according to the groups 320, 322 in which the nodes 312-1 to 312-6 are assembled. In any regard, the processor may assemble each of the activities 214-1 to 214-*n* into one of the plurality of groups 220 based on the properties of the edges 314-1 to 314-4 between the respective pairs of nodes 312-1 to 312-*n*.

The processor may fetch, decode, and execute the instructions 604 to determine to which of a plurality of groups 220 of activities a user is classified based on prior user activities of the user. The processor may make this determination in manners similar to those discussed above with respect to determining the groups to which a user identifier of a user is classified. The processor may fetch, decode, and execute the instructions 606 to determine whether a user event 202 of the user matches an activity in a group 220 to which the user is classified. The processor may fetch, decode, and execute the instructions 608 to, based on a determination that the user event 202 matches an activity in a group 220 to which the user is classified, determine that the user event 202 is normal. The processor may fetch, decode, and execute the instructions 610 to, based on a determination that the user event 202 does not match an activity in a group 220 to which the user is classified, determine that the user event is abnormal and output 230 an indication that the user event 202 is abnormal. The processor may also output 230 an instruction to limit or deny access by a user identifier associated with the user event 202 to the application.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
   a processor; and
   a computer readable medium on which is stored machine readable instructions that are to cause the processor to:
   access user activity data that identifies activities and user identifiers corresponding to the activities;
   identify a first pair of activities that corresponds to a first set of common user identifiers in the user activity data;
   identify a second pair of activities that corresponds to a second set of common user identifiers in the user activity data;
   determine how many user identifiers correspond to the first pair of activities;
   determine how many user identifiers correspond to the second pair of activities;
   assign the activities into a plurality of groups based on how many user identifiers correspond to each of the first and second pairs of activities;
   determine a correlation between a user event and the plurality of groups;
   determine whether the user event is suspicious based on the determined correlation; and
   based on a determination that the user event is suspicious, output an indication that the user event is suspicious.

2. The apparatus of claim 1, wherein the instructions are further to cause the processor to:
   assign each of the activities as a node in a graph;
   assign edges between respective pairs of nodes, wherein a property of each of the edges corresponds to a determined number of user identifiers for the respective pair of nodes to which the edge connects; and
   assign the activities into a plurality of groups based on the properties of the edges between the respective pairs of nodes.

3. The apparatus of claim 2, wherein the instructions are further to cause the processor to:
   apply a distinguishing characteristic to the nodes according to the groups in which the nodes are assigned.

4. The apparatus of claim 1, wherein to determine the correlation between the user event and the plurality of groups, the instructions are further to cause the processor to:
   identify a user identifier of the user event;
   determine prior user activities corresponding to the identified user identifier; and
   based on the determined prior user activities, determine to which of the plurality of groups the identified user identifier belongs.

5. The apparatus of claim 4, wherein, to determine whether the user event is suspicious, the instructions are further to cause the processor to:
   determine that the user event does not fall within a group to which the user identifier belongs; and
   based on a determination that the user event does not fall within a group to which the user identifier belongs, determine that the user event is suspicious.

6. The apparatus of claim 4, wherein the instructions are further to cause the processor to:
   based on a determination the user event is suspicious, output the determined prior user activities corresponding to the identified user identifier.

7. The apparatus of claim 4, wherein, to determine whether the user event is suspicious, the instructions are further to cause the processor to:
   determine that the user event falls inside of a group to which the user identifier belongs; and
   based on a determination that the user event falls within a group to which the user identifier belongs, determine that the user event is not suspicious.

8. The apparatus of claim 1, wherein the instructions are further to cause the processor to:
   based on a determination that the user event is suspicious, output an instruction to limit or deny access by a user identifier associated with the user event to an application.

9. A method comprising:
   accessing, by a processor, user activity data pertaining to an application, the user activity data including activities and user identifiers corresponding to the activities;
   identifying, by the processor, a first pair of activities that corresponds to a first set of common user identifiers in the user activity data;
   identifying, by the processor, a second pair of activities that corresponds to a second set of common user identifiers in the user activity data;
   determining, by the processor, how many user identifiers correspond to the first pair of activities;
   determining, by the processor, how many user identifiers correspond to the second pair of activities;

assembling, by the processor, each of the activities into one of a plurality of groups based on how many user identifiers correspond to each of the first and second pairs of activities;

identify a user event;

determining, by the processor, to which of the plurality of groups a user identifier of the user event belongs;

based on the determined group to which the user identifier of the user event belongs, determining, by the processor whether the user event is abnormal; and based on a determination that the user event is abnormal, outputting, by the processor, an indication that the user event is abnormal.

10. The method of claim 9, further comprising:

determining prior user activities corresponding to the user identifier of the user event; and based on the determined prior user activities, determining to which of the plurality of groups the user identifier of the user event belongs.

11. The method of claim 10, further comprising:

determining that the user event does not fall within a group to which the user identifier of the user event is determined to belong; and based on a determination that the user event does not fall within a group to which the user identifier belongs, determining that the user event is abnormal.

12. The method of claim 11, further comprising:

based on a determination that the user event is abnormal, outputting the determined user activities corresponding to the user identifier of the user event.

13. The method of claim 10, further comprising:

determining that the user event does not match any of the determined prior user activities corresponding to the user identifier of the user event and falls within a group to which the user identifier of the user event is determined to belong; and based on the determination that the user event does not match any of the determined prior user activities corresponding to the user identifier of the user event and falls within a group to which the user identifier of the user event is determined to belong, determining that the user event is normal.

14. The method of claim 9, further comprising:

assigning each of the activities in the plurality of activities as a respective node in a graph;

assigning edges between respective pairs of nodes, wherein a property of each of the edges corresponds to a determined number of user identifiers for the respective pair of nodes to which the edge connects; and wherein assembling each of the activities further comprises assembling each of the activities into one of the plurality of groups based on the properties of the edges between the respective pairs of nodes.

15. The method of claim 14, further comprising:

applying a distinguishing characteristic to the nodes according to the groups in which the nodes are assembled.

16. A computer readable medium on which is stored machine readable instructions that when executed by a processor, cause the processor to:

identify a first pair of activities that corresponds to a first set of common users;

identify a second pair of activities that corresponds to a second set of common users;

determine how many users correspond to the first pair of activities;

determine how many users correspond to the second pair of activities;

assign the activities into a plurality of groups based on how many users correspond to each of the first and second pairs of activities;

determine to which of the plurality of groups of activities a user is classified based on prior user activities of the user;

determine whether a user event of the user matches an activity in a group to which the user is classified;

based on a determination that the user event matches an activity in a group to which the user is classified, determine that the user event is normal; and based on a determination that the user event does not match an activity in a group to which the user is classified, determine that the user event is abnormal; and output an indication that the user event is abnormal.

17. The computer readable medium of claim 16, wherein the instructions are further to cause the processor to:

identify correlations between users and activities on an application; and assemble the activities into the plurality of groups based on the identified correlations.

18. The computer readable medium of claim 16, wherein the instructions are further to cause the processor to:

determine that the user event does not match any of the prior user activities and that the user event falls within a group to which the user is classified; and based on the determination that the user event does not match any of the user activities of the user and that the user event falls within a group to which the user is classified, determine that the user event is normal.

* * * * *